(12) United States Patent
Naito et al.

(10) Patent No.: US 10,336,426 B2
(45) Date of Patent: Jul. 2, 2019

(54) OUTBOARD MOTOR

(71) Applicant: YAMAHA HATSUDOKI KABUSHIKI KAISHA, Iwata-shi, Shizuoka (JP)

(72) Inventors: Takeshi Naito, Shizuoka (JP); Yoshihiro Mizushima, Shizuoka (JP); Kazuyuki Agemura, Shizuoka (JP); Makoto Mizutani, Shizuoka (JP); Takeshi Ohata, Shizuoka (JP); Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/806,452

(22) Filed: Nov. 8, 2017

(65) Prior Publication Data

US 2018/0362130 A1 Dec. 20, 2018

(30) Foreign Application Priority Data

Jun. 14, 2017 (JP) ................. 2017-116795

(51) Int. Cl.
| | | |
|---|---|---|
| *B60L 3/00* | (2019.01) | |
| *B60L 15/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *B63H 20/10* | (2006.01) | |
| *B63J 99/00* | (2009.01) | |
| *B63H 20/12* | (2006.01) | |
| *B63H 25/42* | (2006.01) | |
| *H02P 5/00* | (2016.01) | |

(Continued)

(52) U.S. Cl.
CPC ........... *B63H 20/10* (2013.01); *B63H 20/001* (2013.01); *B63H 20/12* (2013.01); *B63H 25/42* (2013.01); *B63J 99/00* (2013.01); *H02P 5/00* (2013.01); *B63J 2099/006* (2013.01)

(58) Field of Classification Search
CPC ...... B63H 20/10; B63H 20/001; B63H 20/12; B63H 21/213; B63H 25/42; B63J 99/00; H02P 5/00
USPC ........................... 701/21; 440/1, 86; 318/139
See application file for complete search history.

(56) References Cited

U.S. PATENT DOCUMENTS

2006/0057911 A1\* 3/2006 Oguma ................ B63H 21/213
440/86
2008/0261466 A1\* 10/2008 Kishibata ............... B63H 20/10
440/1

(Continued)

FOREIGN PATENT DOCUMENTS

JP 2014-177172 A 9/2014

*Primary Examiner* — Mahmoud S Ismail
(74) *Attorney, Agent, or Firm* — Keating and Bennett, LLP

(57) ABSTRACT

A trim-tilt device includes a first electric motor electrically connected to a power source and tilts an outboard motor body in an up-and-down direction. A steering device includes a second electric motor electrically connected to the power source. The steering device turns the outboard motor body in a right-and-left direction. A fuel pump is electrically connected to the power source, and supplies fuel to an engine. A controller limits an inrush current into the first electric motor using a PWM control for a predetermined period of time from a starting time point of an input current into the first electric motor.

5 Claims, 9 Drawing Sheets

(51) Int. Cl.
    *B63H 20/00*     (2006.01)
    *B63H 21/22*     (2006.01)
    *B63H 23/00*     (2006.01)
    *B63H 21/21*     (2006.01)
    *B60W 10/04*     (2006.01)
    *H02P 1/00*     (2006.01)

(56) References Cited

U.S. PATENT DOCUMENTS

| | | | | |
|---|---|---|---|---|
| 2009/0215331 A1* | 8/2009 | Suzuki | ................ | B63H 21/213 |
| | | | | 440/1 |
| 2015/0084554 A1* | 3/2015 | Tsuruta | ................ | H02P 1/16 |
| | | | | 318/139 |
| 2018/0162379 A1* | 6/2018 | Mizuno | ................ | B60K 6/445 |

* cited by examiner

OUTBOARD MOTOR

CROSS REFERENCE TO RELATED APPLICATIONS

This application claims the benefit of priority to Japanese Patent Application No. 2017-116795 filed on Jun. 14, 2017. The entire contents of this application are hereby incorporated herein by reference.

BACKGROUND OF THE INVENTION

1. Field of the Invention

The present invention relates to outboard motors.

2. Description of the Related Art

There is a type of outboard motor equipped with a trim-tilt device that tilts an outboard motor body including an engine in the up-and-down direction. For example, in an outboard motor described in Japan Laid-open Patent Application Publication No. 2014-177172, a trim-tilt device includes a PTT motor, a hydraulic pump and a hydraulic cylinder. The PTT motor is an electric motor and is electrically connected to a power source such as a battery. The hydraulic pump discharges hydraulic fluid when driven by the PTT motor. The hydraulic cylinder extends and retracts when supplied with the hydraulic fluid from the hydraulic pump, and the extension and retraction motions thereof cause the outboard motor body to perform a trim motion and a tilt motion.

On the other hand, there is a type of outboard motor equipped with a steering device that turns the outboard motor body right and left. For example, the steering device includes a steering motor. The steering motor is an electric motor and is electrically connected to a power source. The steering device turns the outboard motor body right and left by the driving force of the steering motor.

Yet on the other hand, there is a type of outboard motor equipped with a fuel pump for supplying fuel to the engine. The fuel pump is electrically connected to a power source. The engine is driven when supplied with the fuel discharged from the fuel pump. Among the devices described above, the PTT motor and the steering motor require a large amount of electric power. Especially, a large load acts on the trim-tilt device when starting actuation of the trim-tilt device. Hence, a large inrush current occurs in the PTT motor. Because of this, when the PTT motor, the steering motor and the fuel pump are connected to a common power source, an increase in the size of a generator or battery that supply electric power to the PTT motor, the steering motor and the fuel pump is inevitable. However, space is limited inside a cowl of the outboard motor, such that an increase in the size of the generator or battery is difficult.

SUMMARY OF THE INVENTION

Preferred Embodiments of the Present Invention significantly reduce or prevent an increase in the size of a generator or battery, and reliably supply sufficient electric power when starting actuation of a trim-tilt device in an outboard motor.

An outboard motor according to a preferred embodiment of the present invention includes an outboard motor body, a power source, a trim-tilt device, a steering device, a fuel pump and a controller. The outboard motor body includes an engine. The trim-tilt device includes a first electric motor electrically connected to the power source. The trim-tilt device tilts the outboard motor body in an up-and-down direction. The steering device includes a second electric motor electrically connected to the power source. The steering device turns the outboard motor body in a right-and-left direction. The fuel pump is electrically connected to the power source, and supplies fuel to an engine. The controller is configured or programmed to limit an inrush current into the first electric motor using a PWM (Pulse Width Modulation) control for a predetermined period of time from a starting time point of an input current into the first electric motor.

In an outboard motor according to a preferred embodiment of the present invention, the inrush current into the first electric motor is limited by the PWM control for the predetermined period of time from the starting time point of the input current into the first electric motor. Accordingly, an increase in the size of a generator or battery is significantly reduced or prevented, while sufficient electric power is reliably supplied even when starting actuation of the trim-tilt device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
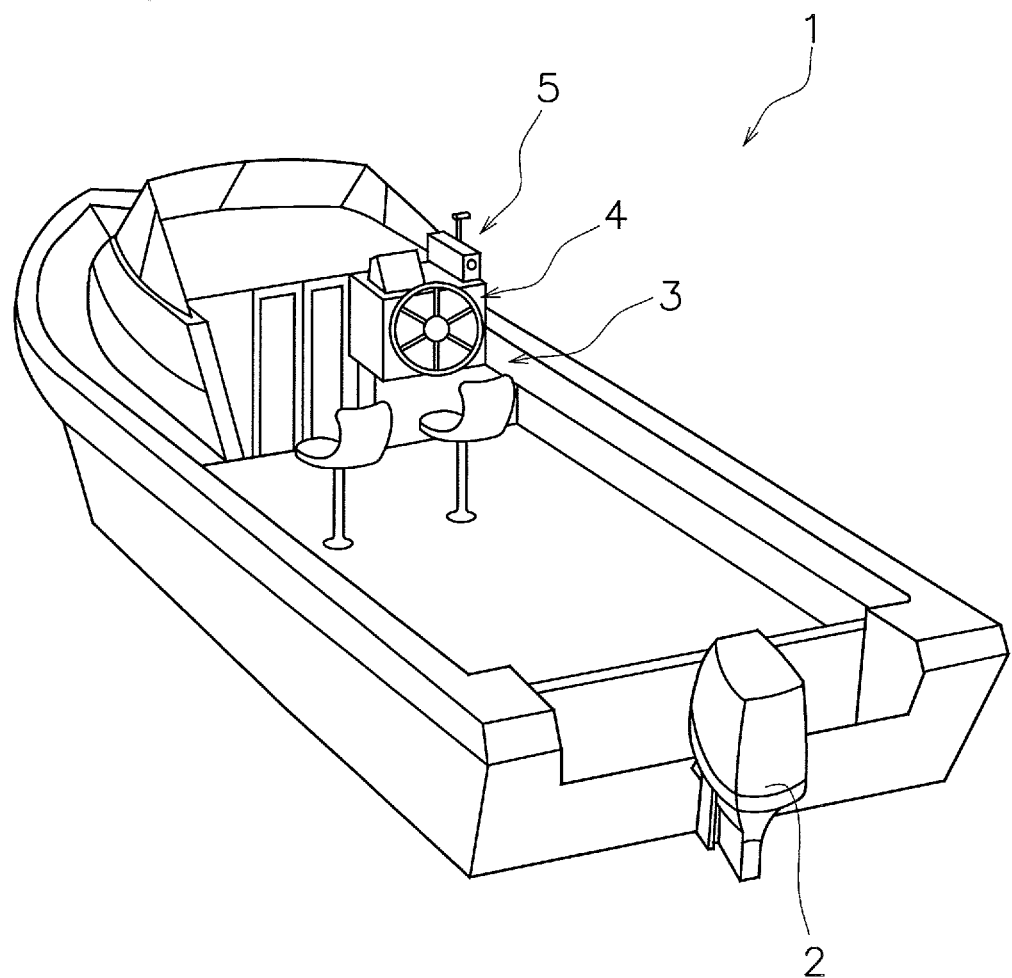
FIG. 1 is a perspective view of a watercraft to which an outboard motor according to a preferred embodiment of the present invention is mounted.

Preferred embodiments of the present invention will be hereinafter explained with reference to drawings. FIG. 1 is a perspective view of a watercraft 1 to which an outboard motor 2 according to a preferred embodiment is mounted. The outboard motor 2 is attached to the stern of the watercraft 1. The outboard motor 2 generates a thrust to propel the watercraft 1. In the present preferred embodiment, a single outboard motor 2 is mounted to the watercraft 1, but alternatively, two or more outboard motors 2 may be mounted to the watercraft 1.

The watercraft 1 includes a cockpit 3. A steering member 4 and a remote control 5 are disposed in the cockpit 3. The steering member 4 allows an operator to turn the direction of the watercraft 1. The steering member 4 may be, for instance, a steering wheel. The remote control 5 allows the operator to regulate the vessel velocity. The remote control 5 also allows the operator to switch between forward movement and backward movement of the watercraft 1.

Figure 2:
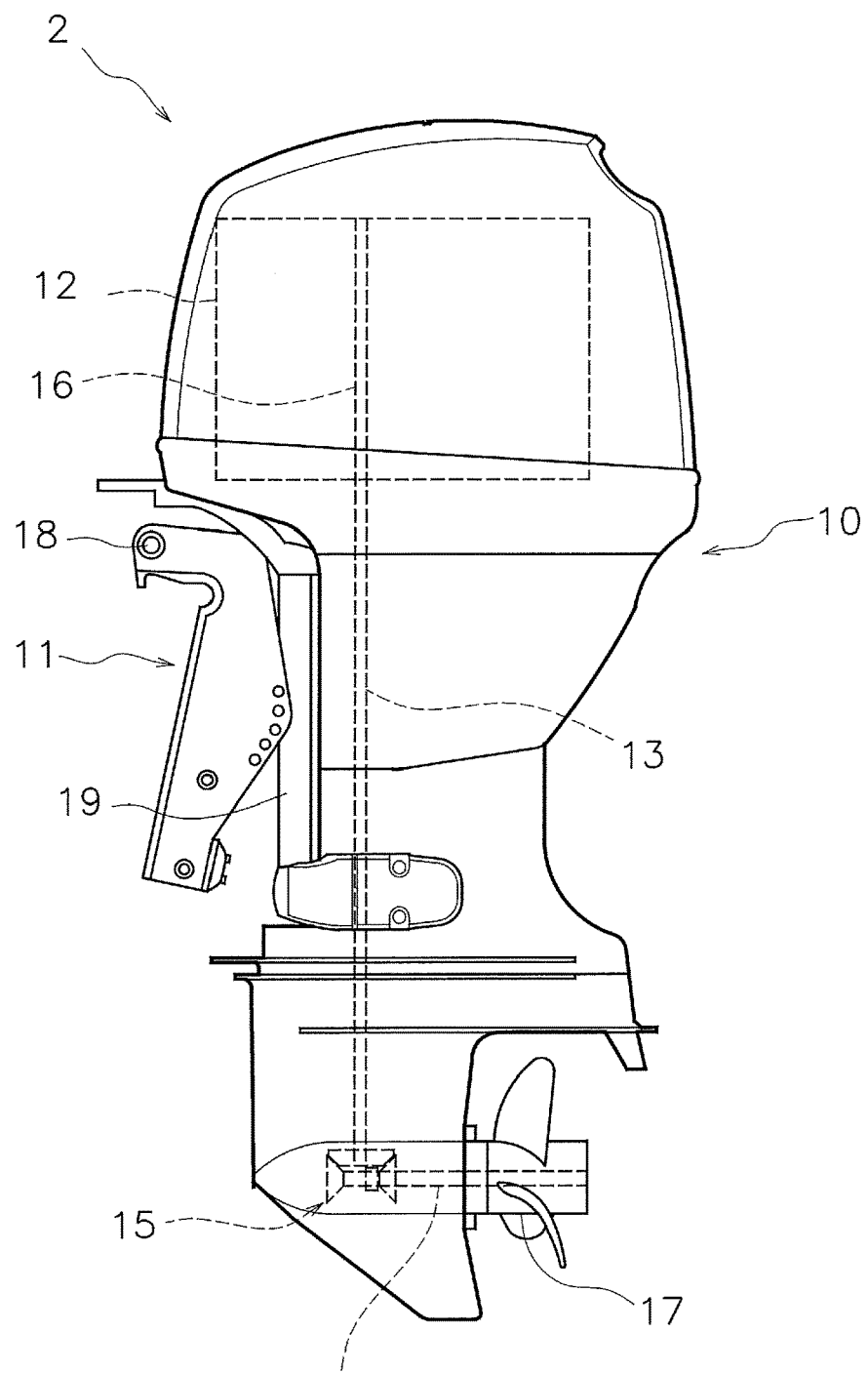
FIG. 2 is a side view of the outboard motor.

FIG. 2 is a side view of the outboard motor 2. The outboard motor 2 includes an outboard motor body 10 and a bracket 11. The outboard motor body 10 is attached to the watercraft 1 through the bracket 11. The outboard motor body 10 includes an engine 12, a drive shaft 13, a propeller shaft 14 and a shift mechanism 15.

The engine 12 generates the thrust to propel the watercraft 1. The engine 12 includes a crankshaft 16. The crankshaft 16 extends in the vertical direction.

The drive shaft 13 is connected to the crankshaft 16. The drive shaft 13 extends in the vertical direction. The propeller shaft 14 extends in the back-and-forth direction. The propeller shaft 14 is connected to the drive shaft 13 through the shift mechanism 15. A propeller 17 is connected to the propeller shaft 14.

The shift mechanism 15 switches the rotational direction of power to be transmitted from the drive shaft 13 to the propeller shaft 14. For example, the shift mechanism 15 includes a plurality of gears and a clutch that changes meshing of gears.

The bracket 11 includes a trim-tilt shaft 18 and a steering shaft 19. The trim-tilt shaft 18 extends in the right-and-left direction. The bracket 11 supports the outboard motor body 10 such that the outboard motor body 10 is rotatable about the trim-tilt shaft 18. The steering shaft 19 extends in the vertical direction. The bracket 11 supports the outboard motor body 10 such that the outboard motor body 10 is rotatable about the steering shaft 19.

Figure 3:
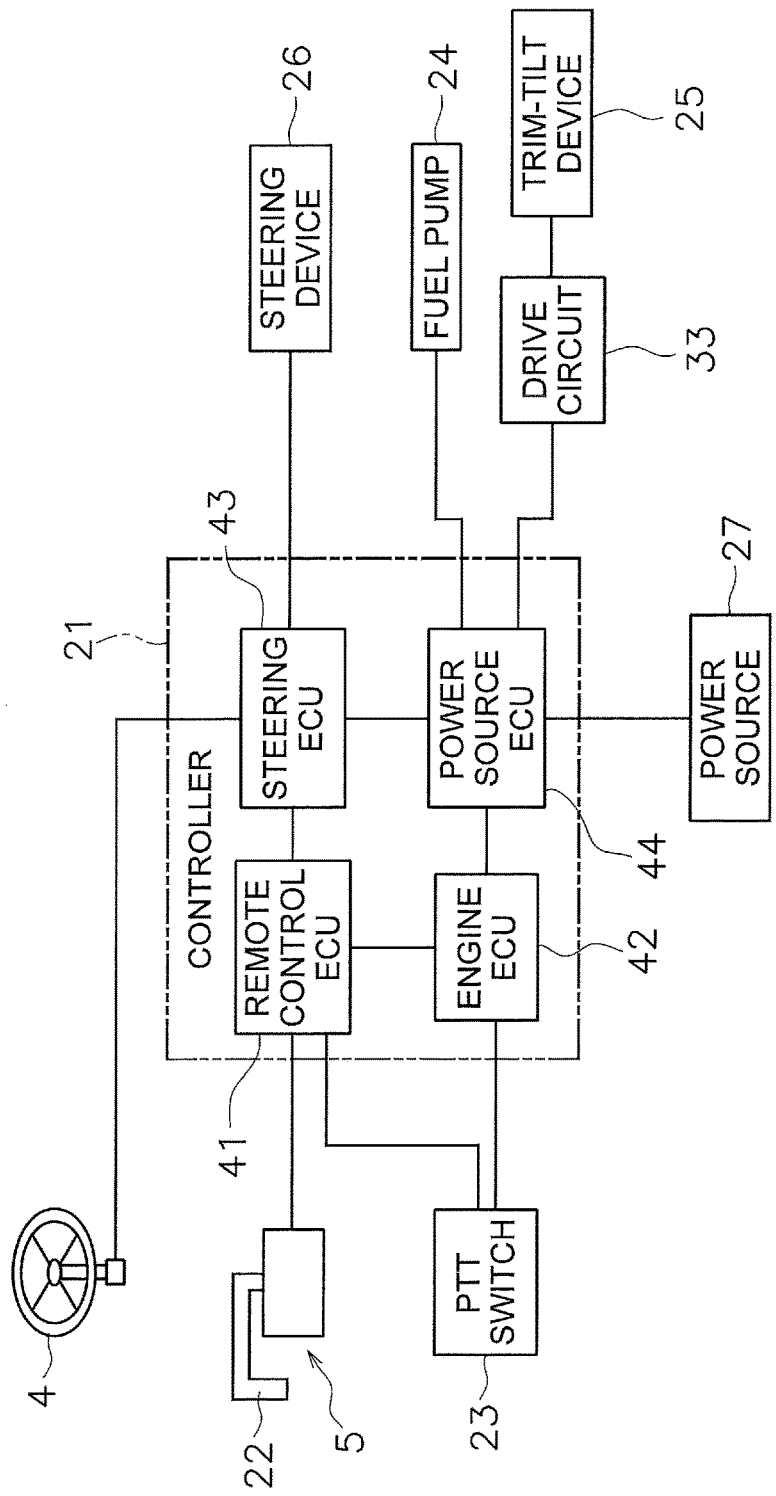
FIG. 3 is a schematic diagram of a control system of the outboard motor.

FIG. 3 is a schematic diagram showing a control system of the outboard motor 2. As shown in FIG. 3, the outboard motor 2 includes a controller 21. The controller 21 includes a computer such as a CPU and memories such as a RAM and a ROM. The controller 21 stores programs and data to control the outboard motor 2. The controller 21 is connected to the remote control 5 and the steering member 4, both of which are described above, so as to communicate with each other.

The controller 21 preferably includes a plurality of ECUs (Electronic Control Units), for example. More specifically, the controller 21 includes a remote control ECU 41, an engine ECU 42, a steering ECU 43 and a power source ECU 44. Each of the remote control ECU 41, the engine ECU 42, the steering ECU 43 and the power source ECU 44 includes a computer including a computing unit such as a CPU and memories such as a RAM and a ROM. The remote control ECU 41, the engine ECU 42, the steering ECU 43 and the power source ECU 44 are connected to each other to exchange data through wired or wireless communication.

The remote control 5 includes a throttle member 22. The throttle member 22 includes, for instance, a throttle lever. The throttle member 22 is operable from a zero operation position to a forward moving direction side and a backward moving direction side. The remote control 5 outputs an operating signal, which indicates the position of the throttle member 22, to the remote control ECU 41.

The steering member 4 is rotatable right and left from a middle position. The steering member 4 outputs an operating signal, which indicates the position of the steering member 4, to the steering ECU 43.

The outboard motor 2 includes a fuel pump 24, a trim-tilt device 25 and a steering device 26. The fuel pump 24 is connected to a fuel tank disposed inside either the outboard motor body 10 or the watercraft 1. The fuel pump 24 supplies fuel from the fuel tank to the engine 12.

The trim-tilt device 25 rotates the outboard motor body 10 about the trim-tilt shaft 18 so as to tilt the outboard motor body 10 in the up-and-down direction. The steering device 26 rotates the outboard motor body 10 about the steering shaft 19 so as to turn the outboard motor body 10 in the right-and-left direction.

The engine ECU 42 receives a signal, which indicates the operating amount of the throttle member 22, from the remote control ECU 41. The engine ECU 42 outputs a command signal to the engine 12 such that the engine rotational speed is increased or reduced in accordance with the operating amount of the throttle member 22. Therefore, the operator is able to regulate the vessel velocity of the watercraft 1 by operating the throttle member 22.

The steering ECU 43 receives the signal, which indicates the operating amount and the operating direction of the steering member 4, from the steering member 4. The steering ECU 43 outputs a command signal to the steering device 26 such that the outboard motor body 10 is turned in the right-and-left direction in accordance with the operating amount and the operating direction of the steering member 4. Therefore, the operator is able to regulate the moving direction of the watercraft 1 by operating the steering member 4.

The outboard motor 2 includes a PTT switch 23. The PTT switch 23 allows the operator to trim and tilt the outboard motor body 10. For example, the PTT switch 23 is located on the outboard motor body 10. Alternatively, the PTT switch 23 may be located on another device such as the remote control 5. When the PTT switch 23 is operated, a signal, which indicates operating the PTT switch 23, is outputted to the remote control ECU 41. The signal, which indicates operation of the PTT switch 23, may be outputted to the engine ECU 42.

Figure 4:
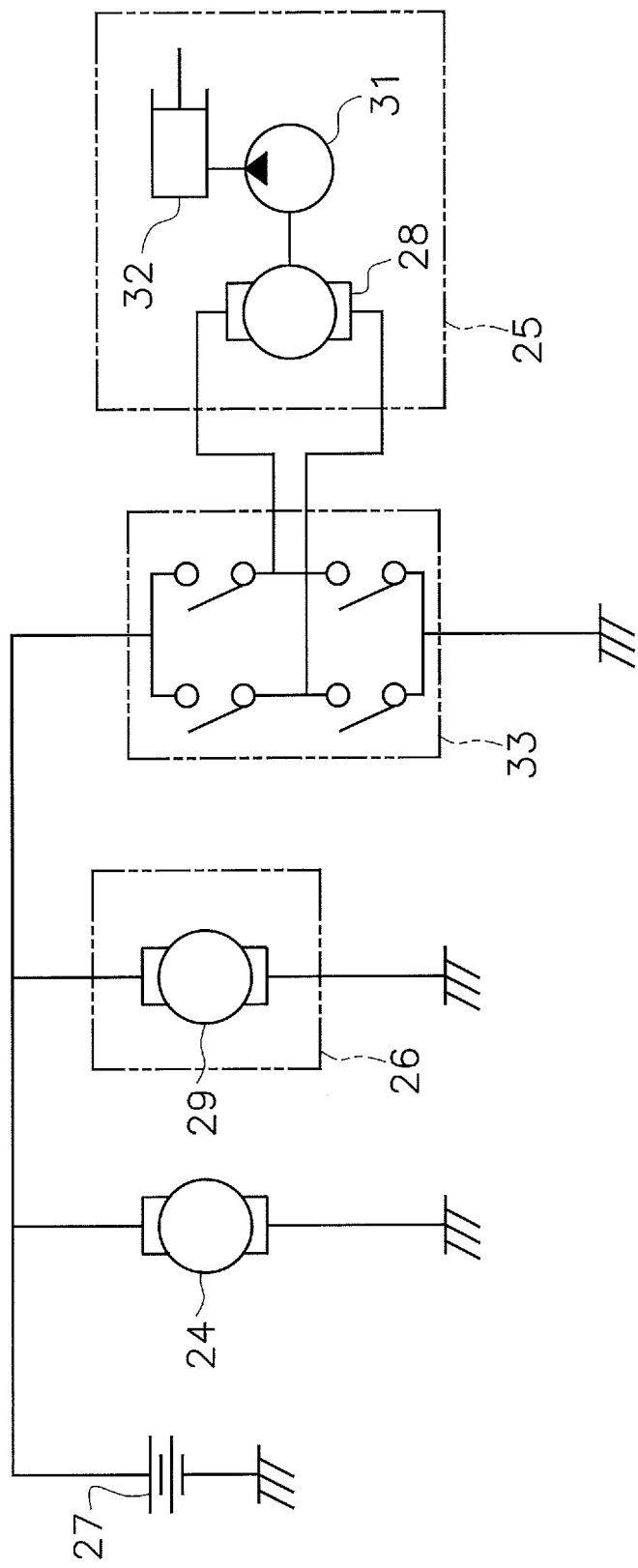
FIG. 4 is a schematic diagram of an electric circuit provided in the outboard motor.

FIG. 4 is a schematic diagram of an electric circuit provided in the outboard motor 2. As shown in FIG. 4, the outboard motor 2 includes a power source 27. The power source 27 is, for instance, a battery. The fuel pump 24 is an electric pump and is electrically connected to the power source 27. The fuel pump 24 is driven by electric power supplied thereto from the power source 27.

The trim-tilt device 25 includes a first electric motor 28. The first electric motor 28 is electrically connected to the power source 27. The first electric motor 28 is driven by electric power supplied thereto from the power source 27. The trim-tilt device 25 includes a hydraulic pump 31 and a hydraulic cylinder 32. The hydraulic pump 31 is driven by the first electric motor 28. The hydraulic cylinder 32 extends and retracts due to hydraulic fluid discharged from the hydraulic pump 31. The trim-tilt device 25 tilts the outboard motor body 10 in the up-and-down direction due to the extension and retraction of the hydraulic cylinder 32.

The steering device 26 includes a second electric motor 29. The second electric motor 29 is electrically connected to the power source 27. The second electric motor 29 is driven by electric power supplied thereto from the power source 27. In conjunction with driving the second electric motor 29, the steering device 26 turns the outboard motor body 10 in the right-and-left direction.

Figure 5:
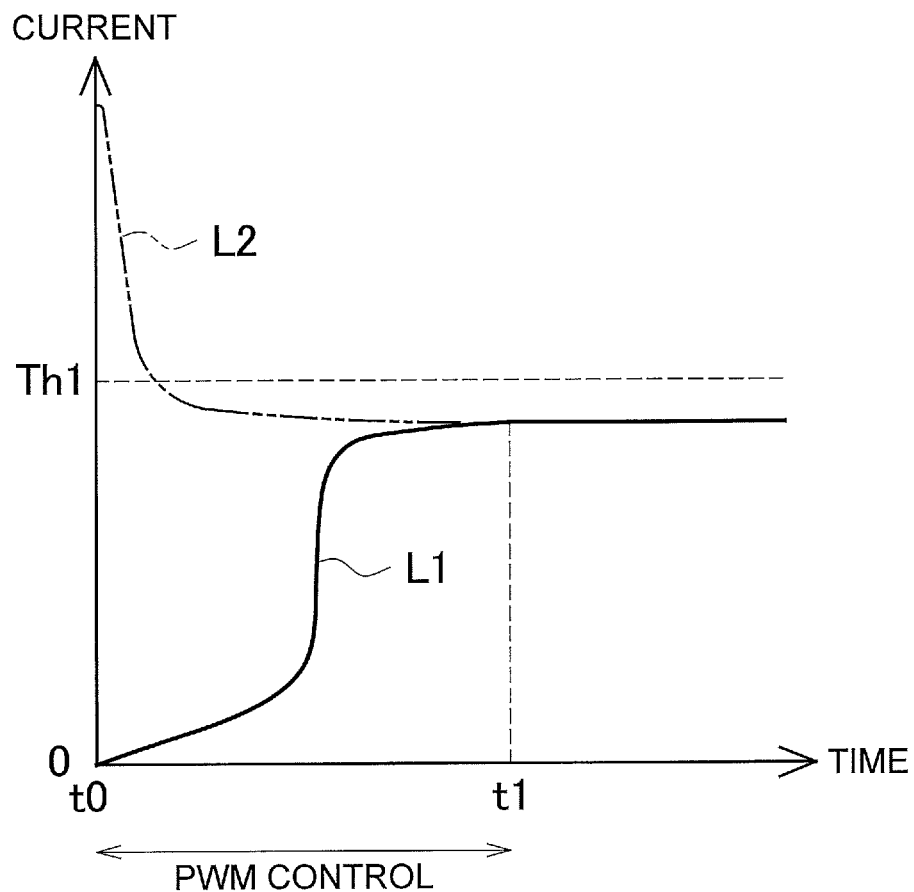
FIG. 5 is a diagram showing a variation in an input current into a first electric motor when operating a PTT switch.

The power source ECU 44 receives the signal, which indicates operation of the PTT switch 23, from either the remote control ECU 41 or the engine ECU 42. The power source ECU 44 outputs a command signal to the trim-tilt device 25 such that the outboard motor body 10 is tilted in the up-and-down direction in response to operation of the PTT switch 23. In FIG. 5, L1 indicates a variation in an input current into the first electric motor 28 when operating the PTT switch 23. As shown in FIG. 5, the power source ECU 44 limits an inrush current into the first electric motor 28 using PWM control for a predetermined period of time from a starting time point t0 of the input current into the first electric motor 28 to a time point t1. It should be noted that the starting time point t0 is a time point at which the PTT switch 23 starts being operated.

Figure 6:
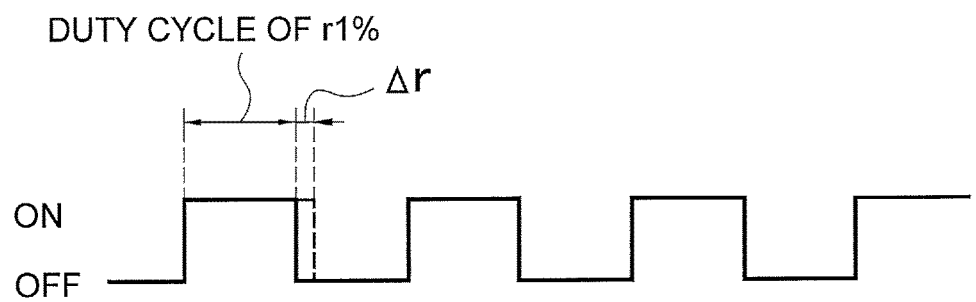
FIG. 6 is a schematic diagram showing a duty cycle during PWM control.

As shown in FIGS. 3 and 4, the outboard motor 2 includes a drive circuit 33 that controls the input current into the first electric motor 28. The drive circuit 33 includes, for instance, a plurality of relays. The plurality of relays are, for instance, mechanical relays. Alternatively, the plurality of relays may be semiconductor relays. The power source ECU 44 performs the PWM control for the first electric motor 28 by controlling the drive circuit 33. As shown in FIG. 6, during the PWM control, the power source ECU 44 sets the duty cycle of the input current into the first electric motor 28 to be less than 100% for the predetermined period of time from the starting time point t0 to the time point t1.

More specifically, the power source ECU 44 sets the duty cycle at the starting time point t0 to be r1. Here, r1 is a percentage value of less than 100%. The power source ECU 44 gradually increases the duty cycle from r1 for the predetermined period of time from the starting time point t0 to the time point t1. For example, the power source ECU 44 increases the duty cycle by Δr every time a predetermined unit of time elapses from the starting time point t0.

The power source ECU 44 finishes performing the PWM control at the time point t1 when the predetermined period of time elapses from the starting time point t0, and thereafter, does not perform the PWM control. In other words, the power source ECU 44 sets the duty cycle of the input current to be 100% at and after the time point t1 when the predetermined period of time elapses from the starting time point t0. It should be noted that the predetermined period of time from the starting time point t0 to the time point t1 is preferably a short period of time of about one second or less, for example. The power source ECU 44 gradually increases the duty cycle of input current from r1 to 100% for the predetermined period of time from the starting time point t0 to the time point t1.

As shown in FIG. 5, the value of the duty cycle at the starting time point t0 (r1), the rate of increase in the duty cycle (Δr) and the predetermined period of time (t1−t0) are set such that the peak input current into the first electric motor 28 is less than a predetermined value Th1. The value of the duty cycle at the starting time point t0 (r1), the rate of increase in the duty cycle (Δr) and the predetermined period of time (t1−t0) may be set such that the peak input current into the first electric motor 28 is less than the predetermined value Th1 when the trim-tilt device 25 and the steering device 26 are simultaneously driven.

In the outboard motor 2 according to the present preferred embodiment, the inrush current into the first electric motor 28 is limited by the PWM control for the predetermined period of time from the starting time point t0 of the input current into the first electric motor 28. Accordingly, as shown in FIG. 5, the peak input current occurs after an operation starting time point of the first electric motor 28, i.e., the starting time point t0. Additionally, when the PWM control is performed, the peak input current is lower than that when the PWM control is not performed (see dashed two-dotted line L2 in FIG. 5).

Therefore, it is possible to significantly reduce or prevent the occurrence of large reduction in voltage when starting actuation of the trim-tilt device 25. Accordingly, an increase in the size of the generator or battery is significantly reduced or prevented, while sufficient electric power is reliably supplied even when starting actuation of the trim-tilt device 25. Additionally, sufficient electric power is reliably supplied even when the trim-tilt device 25 and the steering device 26 are simultaneously actuated.

Preferred embodiments of the present invention have been explained above. However, the present invention is not limited to the preferred embodiments described above, and a variety of changes can be made without departing from the gist of the present invention.

The hydraulic pump 31 and the hydraulic cylinder 32 of the trim-tilt device 25 may be omitted. In other words, the trim-tilt device 25 may tilt the outboard motor body 10 up and down about the trim-tilt shaft 18 using the first electric motor 28 without using hydraulic pressure.

The steering device 26 may include a hydraulic pump and a hydraulic cylinder. In other words, the second electric motor 29 may drive the hydraulic pump, and the hydraulic cylinder may extend and retract due to the hydraulic fluid discharged from the hydraulic pump. The steering device 26 may turn the outboard motor body 10 right and left about the steering shaft 19 due to the extension and retraction of the hydraulic cylinder. The trim-tilt device 25 or the steering device 26 may include a hydraulic motor instead of the hydraulic cylinder.

Figure 7:
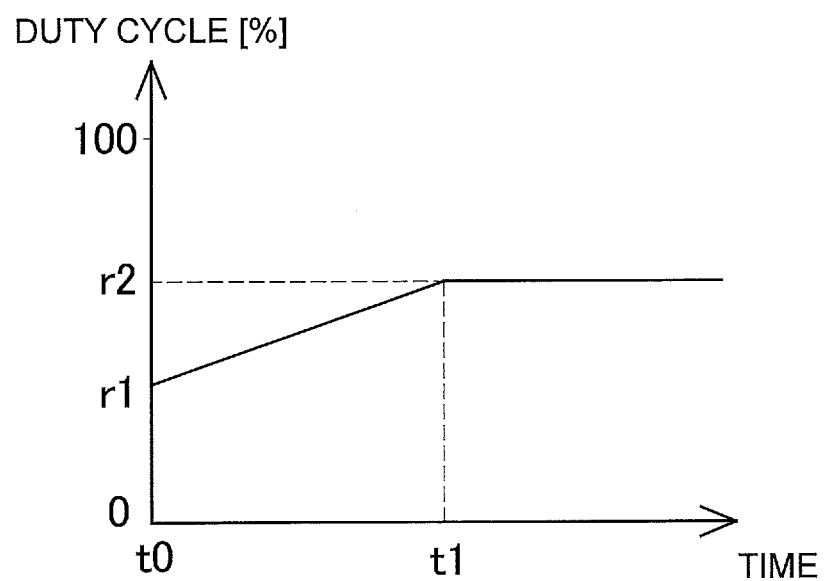
FIG. 7 is a diagram showing a variation in duty cycle during PWM control according to another preferred embodiment of the present invention.

During the PWM control, the duty cycle of the input current may be constant before the elapse of the predetermined period of time from the starting time point t0. As shown in FIG. 7, the duty cycle of the input current may be less than 100% after the elapse of the predetermined period of time from the starting time point t0. It should be noted that when the duty cycle of the input current is r2 after the elapse of the predetermined period of time from the starting time point t0, r1 may be less than r2. Additionally, r2 may be a percentage value less than 100%.

Figure 8:
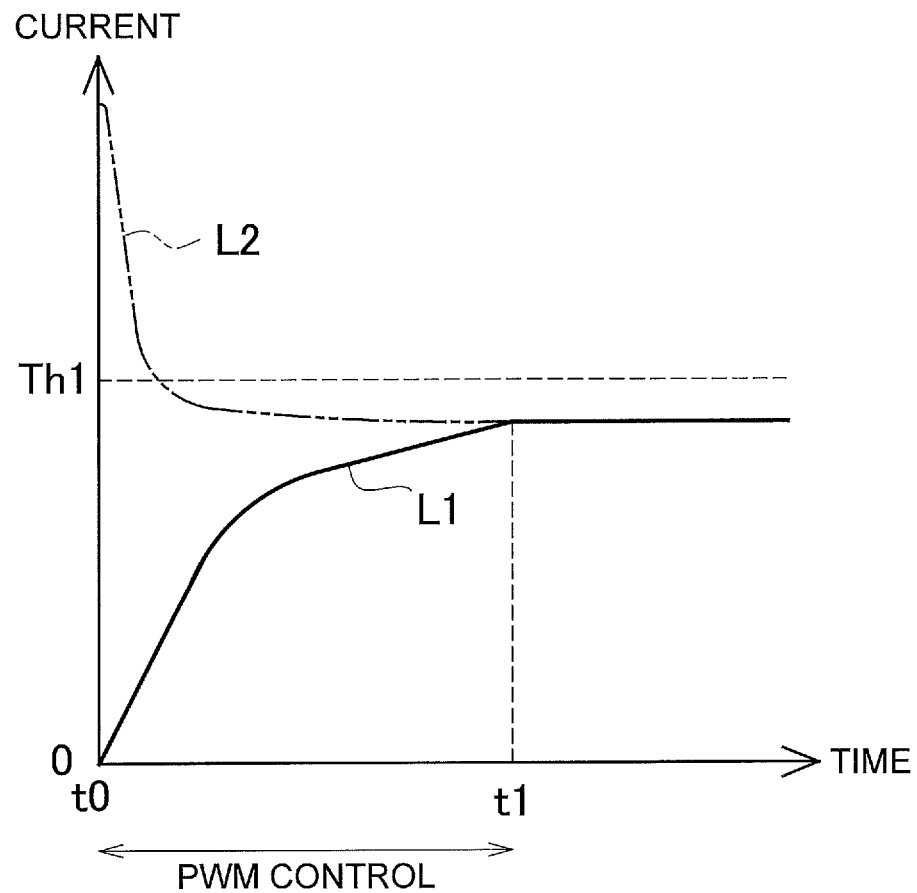
FIG. 8 is a diagram showing a variation in an input current into the first electric motor in a first modified preferred embodiment of the present invention.
Figure 9:
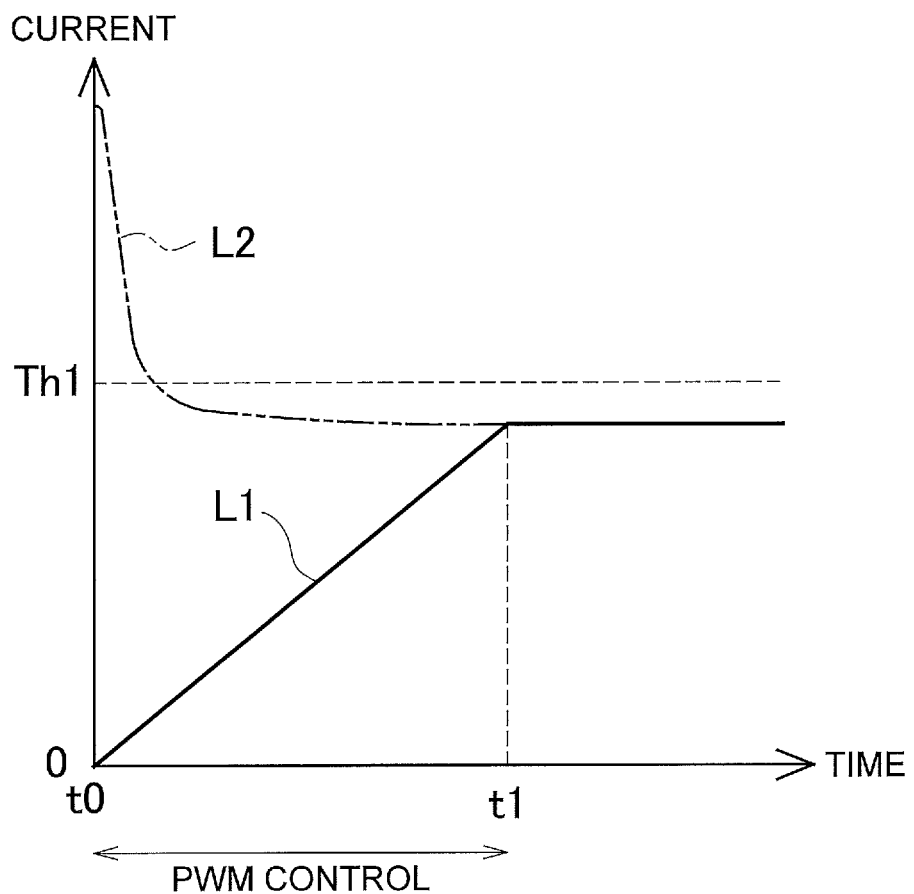
FIG. 9 is a diagram showing variation in input current into the first electric motor in a second modified preferred embodiment of the present invention.

In the preferred embodiments described above, as shown in FIG. 5, the PWM control is preferably performed such that the input power increases in a downwardly protruding curve from the starting time point t0. However, the variation in the input power when performing the PWM control is not limited to that shown in FIG. 5. For example, as shown in FIG. 8, the PWM control may be such that the input power increases in an upwardly protruding curve from the starting time point t0. Alternatively as shown in FIG. 9, the PWM control may be such that the input power increases at a constant rate from the starting time point t0.

In the preferred embodiments described above, the controller 21 preferably includes the remote control ECU 41, the engine ECU 42, the steering ECU 43 and the power source ECU 44. However, any one of these ECUs may be omitted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An outboard motor comprising:
an outboard motor body including an engine;
a power source;

a trim-tilt device including a first electric motor electrically connected to the power source, the trim-tilt device tilting the outboard motor body in an up-and-down direction;

a steering device including a second electric motor electrically connected to the power source, the steering device turning the outboard motor body in a right-and-left direction;

a fuel pump electrically connected to the power source, the fuel pump supplying a fuel to the engine; and a controller configured or programmed to limit an inrush current into the first electric motor using a pulse width modulation control for a predetermined period of time from a starting time point of an input current into the first electric motor; wherein the controller is configured or programmed to perform the pulse width modulation control such that a peak of the input current becomes less than a predetermined value when the trim-tilt device and the steering device are simultaneously driven.

2. The outboard motor according to claim 1, wherein during the pulse width modulation control, the controller is configured or programmed to control the input current, before an elapse of the predetermined period of time from the starting time point of the input current, to have a duty cycle less than a duty cycle of the input current after the elapse of the predetermined period of time.

3. The outboard motor according to claim 2, wherein the duty cycle of the input current after the elapse of the predetermined period of time is 100%.

4. The outboard motor according to claim 1, wherein the controller is configured or programmed to perform the pulse width modulation control such that the peak of the input current occurs after the starting time point of the first electric motor.

5. The outboard motor according to claim 1, wherein
the controller includes a plurality of Electronic Control Units in communication with each other; and
one of the plurality of Electronic Control Units performs the pulse width modulation control.

* * * * *